(12) United States Patent (10) Patent No.: US 8,662,322 B2
Magnusson et al. (45) Date of Patent: Mar. 4, 2014

(54) TOOL HOLDER

(75) Inventors: Reine Magnusson, Vastervik (SE); Rolf Henriksson, Ankarsrum (SE); Joachim Wenström, Ankarsrum (SE); Peter Nilsson, Vastervik (SE)

(73) Assignee: Elfa International AB, Vastervik (SE)

( * ) Notice: Subject to any disclaimer, the term of this patent is extended or adjusted under 35 U.S.C. 154(b) by 286 days.

(21) Appl. No.: 12/735,717

(22) PCT Filed: Feb. 11, 2009

(86) PCT No.: PCT/EP2009/000949
§ 371 (c)(1),
(2), (4) Date: Nov. 1, 2010

(87) PCT Pub. No.: WO2009/100892
PCT Pub. Date: Aug. 20, 2009

(65) Prior Publication Data
US 2011/0042333 A1 Feb. 24, 2011

Related U.S. Application Data

(60) Provisional application No. 61/064,058, filed on Feb. 13, 2008.

(30) Foreign Application Priority Data

Feb. 13, 2008 (SE) ........................... 0800319

(51) Int. Cl.
*A47F 7/00* (2006.01)
(52) U.S. Cl.
USPC .................. 211/70.6; 211/94.01; 211/106.01; 248/303
(58) Field of Classification Search
USPC ............... 211/70.6, 60.1, 59.1, 94.01, 94.02, 211/106.01; 248/303, 304, 220.21, 221.11, 248/222.11, 222.12, 222.13, 225.11; 206/349; 40/658, 647
See application file for complete search history.

(56) References Cited

U.S. PATENT DOCUMENTS 3,094,305 A * 6/1963 Lohrman .................. 248/223.41
3,245,495 A * 4/1966 Wells, Jr. ..................... 182/152
(Continued)

FOREIGN PATENT DOCUMENTS

DE 9115361 U1 2/1992
DE 20 2004 004 034 7/2005
(Continued)

OTHER PUBLICATIONS

International Preliminary Report on Patentability dated Aug. 26, 2010 for corresponding International Application No. PCT/EP2009/000949.

(Continued)

*Primary Examiner* — Korie H Chan
(74) *Attorney, Agent, or Firm* — Harness, Dickey & Pierce, P.L.C.

(57) ABSTRACT

A combination is disclosed. In at least one embodiment, the combination includes a suspension bar, a tool holder adapted for attachment to the suspension bar, a hook device for suspending an object and a fastening device which enables the hook device to be releasably attached to the suspension bar. In at least one embodiment, the fastening device includes a first and a second portion for retaining engagement with the web of the suspension bar and its respective flanges. The first portion forms the upper portion of the fastening device, when mounted, to which portion the hook device is fixedly attached either directly or indirectly. The second portion of the fastening device is pivotally attached to the first portion by way of a joint, which, with the tool holder in its mounted state, is oriented parallel with and located between the flanges of the suspension bar.

11 Claims, 3 Drawing Sheets

(56) References Cited

U.S. PATENT DOCUMENTS

| | | | | |
|---|---|---|---|---|
| 3,957,240 | A * | 5/1976 | Johansson | 248/214 |
| 4,308,961 | A | 1/1982 | Kunce | |
| 4,674,721 | A * | 6/1987 | Thalenfeld | 248/220.22 |
| 4,867,623 | A | 9/1989 | Loyd | |
| 5,110,080 | A * | 5/1992 | Rieman | 248/225.11 |
| 5,135,194 | A * | 8/1992 | Laughon et al. | 248/243 |
| 5,265,992 | A | 11/1993 | Jensen | |
| 5,725,107 | A * | 3/1998 | Dembicks | 211/70.6 |
| 5,740,927 | A | 4/1998 | Yemini | |
| 5,752,791 | A | 5/1998 | Ehrlich | |
| 5,807,047 | A | 9/1998 | Cox | |
| 5,853,092 | A | 12/1998 | Goodman et al. | |
| 5,918,842 | A * | 7/1999 | Garfinkle | 248/223.41 |
| 6,050,426 | A * | 4/2000 | Leurdijk | 211/94.01 |
| 6,364,141 | B1 | 4/2002 | Ehrgott | |
| 6,517,041 | B2 * | 2/2003 | Raum | 248/424 |
| 6,675,980 | B2 | 1/2004 | Ehrgott | |
| 6,932,225 | B2 * | 8/2005 | Rowe | 211/90.02 |
| 6,986,430 | B2 * | 1/2006 | Oren | 211/46 |
| 7,427,053 | B2 * | 9/2008 | Nawrocki | 248/220.21 |
| 8,061,537 | B2 * | 11/2011 | Nilsson et al. | 211/70.6 |
| 2007/0012636 | A1 | 1/2007 | Wisnoski et al. | |
| 2007/0017886 | A1 * | 1/2007 | Kao | 211/94.01 |
| 2008/0000853 | A1 | 1/2008 | Huang | |
| 2008/0105636 | A1 | 5/2008 | Lawson | |
| 2011/0042333 | A1 | 2/2011 | Magnusson et al. | |

FOREIGN PATENT DOCUMENTS

| | | |
|---|---|---|
| JP | 62-211014 | 9/1987 |
| RU | 30790 | 7/2003 |
| WO | WO-2006067999 A1 | 6/2006 |

OTHER PUBLICATIONS

Home Depot. "Rubbermaid FastTrack Garage System.".
Elfa. "Inspirerande idéer för välordnad vardag."
The Container Store. "Let Us Design Your Dream Closet Today."
International Search Report dated Feb. 7, 2009.
Notice of Allowance dated Jul. 11, 2011 issued in U.S. Appl. No. 12/379,086.

* cited by examiner

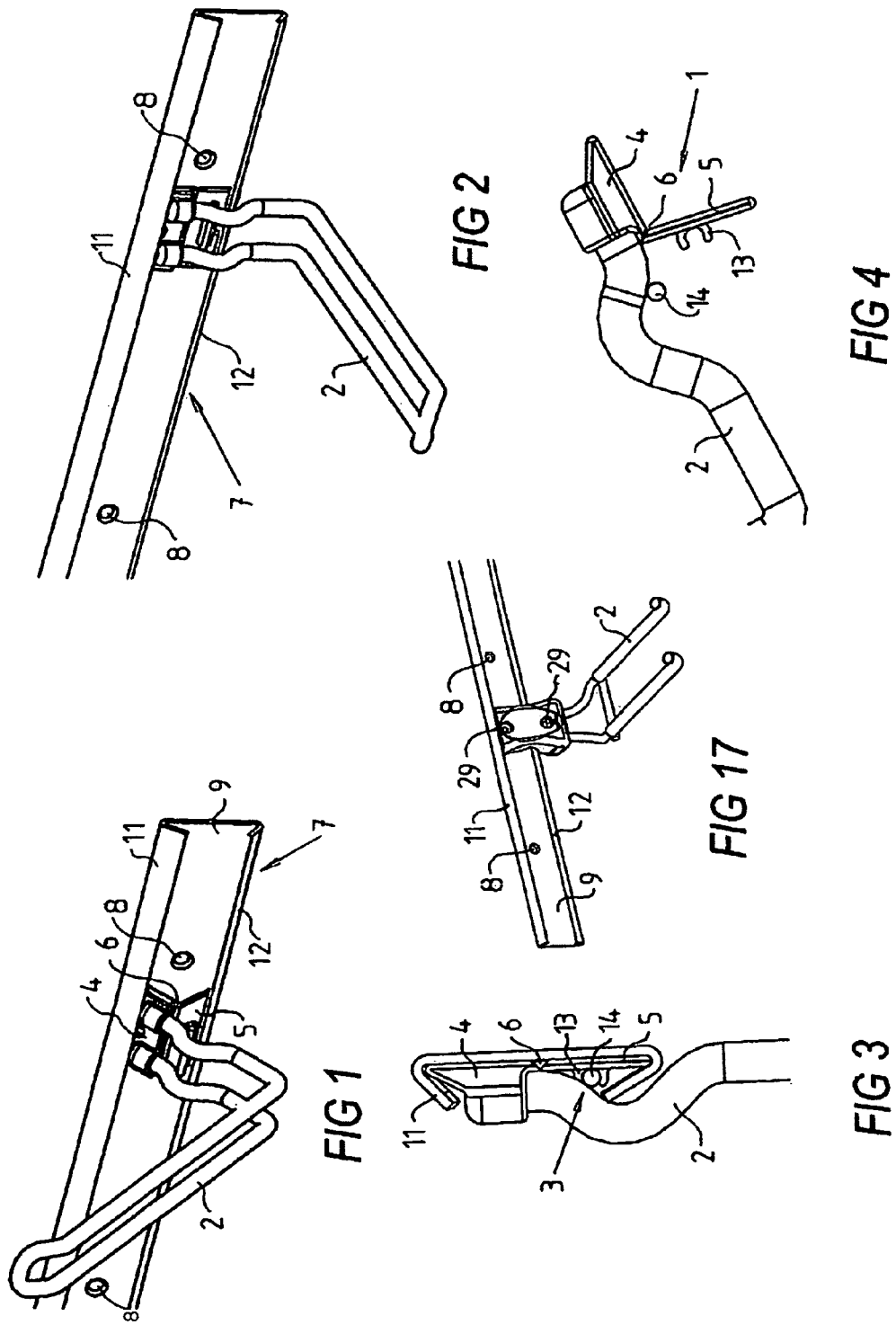

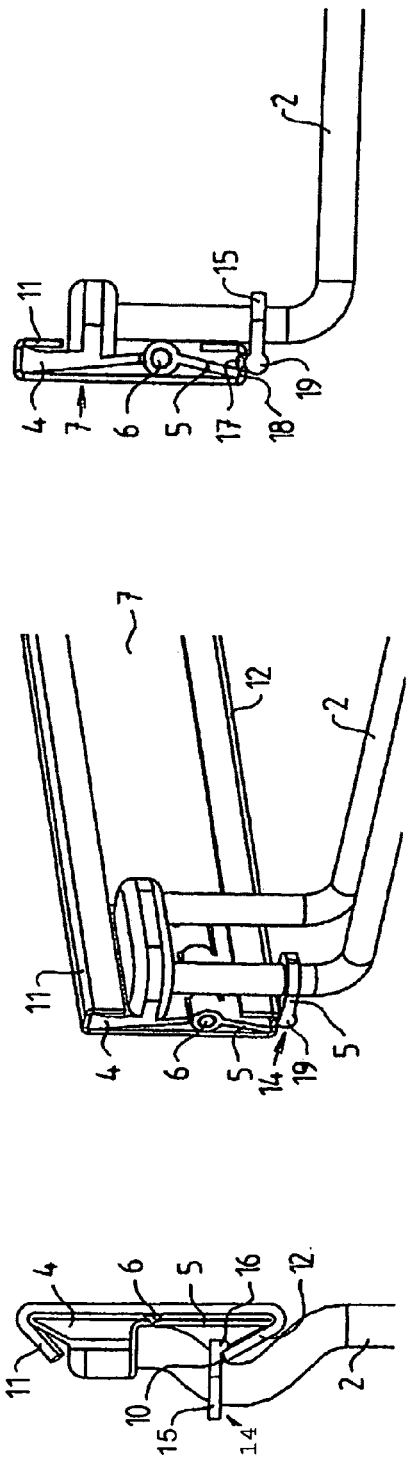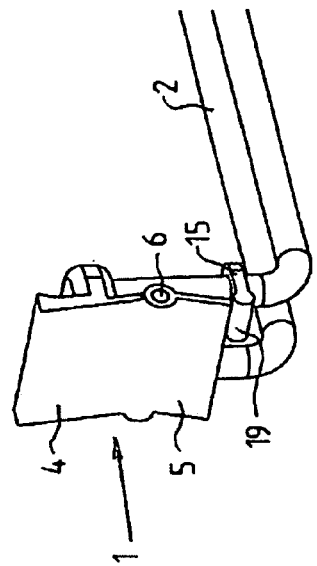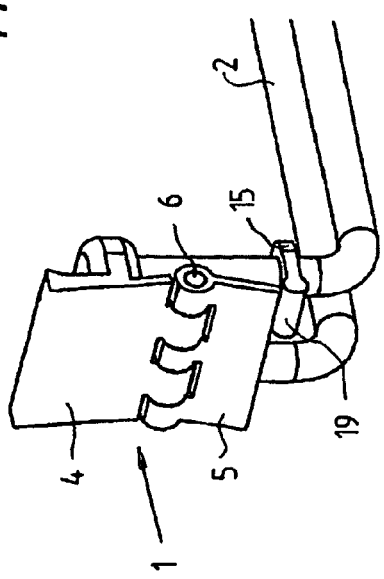

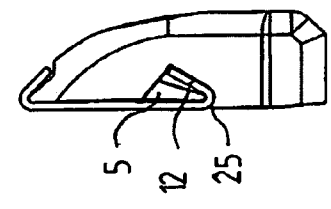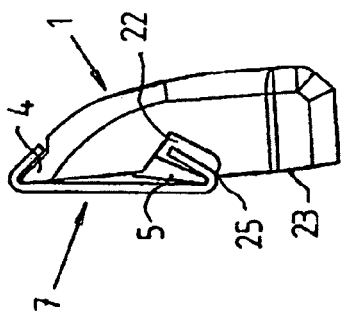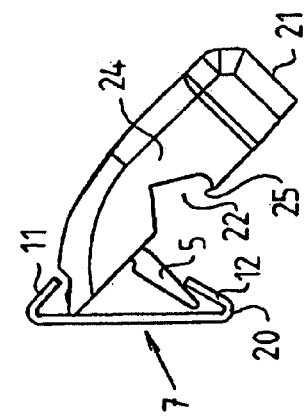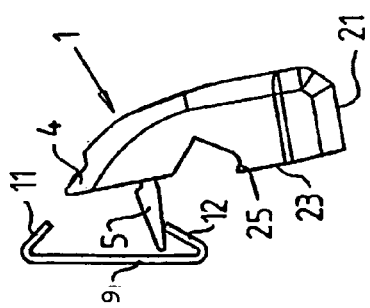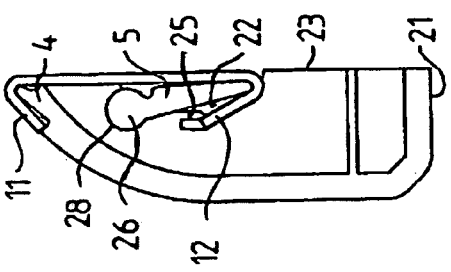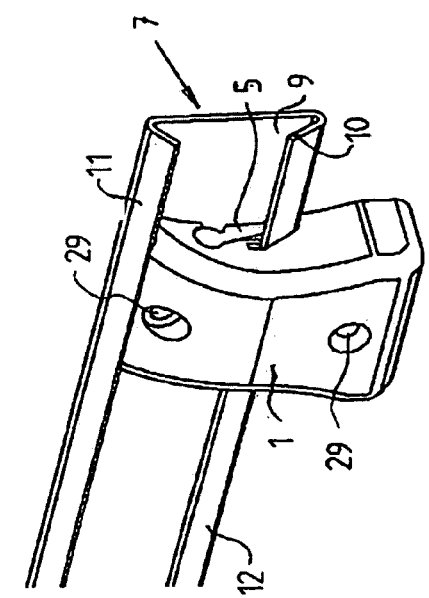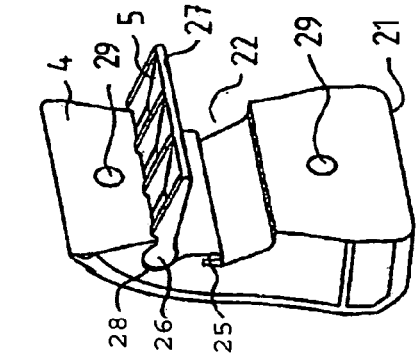

TOOL HOLDER

This is a National Phase of PCT Patent Application No. PCT/EP2009/000949, filed on Feb, 11, 2009, which claims priority under 35 U.S.C. §119 to Sweden Patent Application No. 0800319-6, filed on Feb. 13, 2008, and claims priority under 35 U.S.C. §119 and/or 120 to U.S. Provisional Application No. 61/064,058, filed on Feb. 13, 2008, the contents of each of which are hereby incorporated herein by reference in their entirety.

The present invention relates to a tool holder adapted for attachment to a suspension bar, which comprises a web and at either edge thereof a flange that is bent towards the central part of the web, comprising a hook means or the like for suspending a tool, a piece of sports equipment or another object, and a fastening device which enables the hook means to be releasably attached to the suspension bar.

More specifically, the invention relates to a garage concept, i.e. a system for suspending various objects from the walls of a storage space, such as a garage, so as to interfere with the floor space as little as possible. One or more suspension bars are screwed to the wall(s) of the storage space in a horizontal position and the objects are suspended from the wall by means of hooks or other suspension devices attached to the suspension bar. Alternatively, the suspension bars may be (releasably) attached to vertically oriented columns or hang standards. Suspension bars that are suitable for use with the present invention can be found in the Ella brochure "inspirerande idéer för välordnad vardag" (Inspiring ideas to help you organize your everyday life) and "The Container Store".

The brochure "Rubbermaid, Fast Track Garage System" shows an example of such a system. The system comprises a suspension bar consisting of a web and a pair of arc-shaped flanges that extend away from the web. A plastic rail cover is slipped onto the horizontally mounted suspension bar. Metal or plastic fastening devices having different hook arrangements can be attached to the suspension bar at any desired position by hooking the top portion of the fastening device onto the upper flange of the suspension bar, on top of the plastic rail cover, and then vigorously forcing the bottom portion of the fastening device past the upper flange of the suspension bar. Not only is a considerable force required to mount and dismount the hook arrangements, they also require a special type of suspension bar with out-turned flanges.

The object of the invention is to provide a tool holder having a hook means of any optional type for suspending various objects, including heavy and large objects.

A further object is to provide a tool holder which is easy to mount on and dismount from a suspension bar with only one hand.

Yet another object is to provide a tool holder which is fixedly attached to a suspension bar in a safe manner.

According to the invention, these objects are achieved by a tool holder as described by way of introduction, which is characterised in that the fastening device comprises a first and a second portion for retaining engagement with the web of the suspension bar and its respective flanges, that the first portion forms the upper portion of the fastening device when mounted, to which portion the hook means is fixedly attached either directly or indirectly, and that the second portion of the fastening device is pivotally attached to the first portion by means of a joint, which, with the tool holder in its mounted state, is oriented parallel with and located between the flanges of the suspension bar.

Further developments of the invention will be apparent from the features stated in the dependent claims.

Preferred embodiments of the invention will be described below by way of example and with reference to the accompanying drawings, in which:

FIG. 1 is a perspective view illustrating the attachment of an embodiment of the tool holder according to the invention to a suspension bar;

FIG. 2 is a perspective view of the tool holder in FIG. 1 when fixedly attached to the suspension bar;

FIG. 3 is a partial side view of the tool holder in FIG. 2 when fixedly attached to the suspension bar;

FIG. 4 is a partial side view illustrating the construction of the tool holder in FIGS. 1-3;

FIG. 5 is a partial side view of the tool holder with an alternative locking device;

FIG. 6 is a partial perspective view illustrating another embodiment of the tool holder according to the invention, when fixedly attached to a suspension bar;

FIG. 7 is a partial side view of the tool holder in FIG. 6 when fixedly attached to the suspension bar;

FIG. 8 is a partial perspective view illustrating the construction of the tool holder in FIGS. 6-7;

FIG. 9 is a partial perspective view of an alternative embodiment of a tool holder according to FIGS. 6-8;

FIGS. 10-13 illustrate a further embodiment of the tool holder (without hook means) according to the invention and the different steps for mounting it on a suspension bar;

FIG. 14 is a perspective view of an alternative embodiment of a tool holder (without hook means) according to FIGS. 10-13;

FIG. 15 is a perspective view of the tool holder in FIG. 14 when fixedly attached to a suspension bar;

FIG. 16 is a side view of the tool holder in FIGS. 14-15 when fixedly attached to a suspension bar; and FIG. 17 is a scaled-down perspective view illustrating the tool holder according to FIGS. 10-12 or, alternatively, FIGS. 14-16 with the hook means, when fixedly attached to a suspension bar.

With reference first to FIGS. 1-4, which show a first embodiment of the tool holder according to the invention, the tool holder comprises a fastening device 1, a hook means 2 (cf. FIG. 17) and a locking device 3. The fastening device 1 comprises a first, upper portion 4, to which the hook means 2 of this embodiment is anchored. The fastening device 1 further comprises a second, lower portion 5, which is pivotally connected to the first portion 4 by means of a joint 6. In this embodiment, the first portion 4 and the second portion 5 comprise a common plate with a weak portion or groove forming the joint 6. The joint 6 is oriented in the same direction as the suspension bar 7, in which the fastening device 1 is to be releasably mounted.

The suspension bar 7, which is adapted to the screwed to a wall via through holes 8 or to be attached to vertically oriented columns or hang standards, comprises a web 9 provided with said holes 8. A first, upper flange 11, which is bent towards the central part or centre of the web 9 and at an acute angle thereto, connects onto the upper edge of the web 9 and a second, lower flange 12, which is bent towards the central part of the web 9 and at an acute angle thereto, connects onto the lower edge of the web 9. As is best shown in FIG. 3, the angle and length of the first flange 11 may be different from the angle and length of the second flange 12. Alternatively, and as shown in FIG. 7, the flanges 11, 12 may extend at right angles to the web 9 and may be bent 90 degrees at a certain distance from the web, so that their free edges (cf. the edge portion 10 in FIG. 5) point towards one another. With the tool holder in its mounted state, the joint 6 is positioned between the flanges 11, 12 and is oriented parallel therewith.

Finally, the tool holder comprises a locking device 3, which in the embodiment of the invention according to FIGS. 1-4 consists of a first locking element 13 and a second locking element 14. The first locking element 13 is a C-shaped section made of elastic material, which is attached to or integrated with the second portion 5 of the fastening device. The second locking element 14 is a section in the form of a bar, which is attached to the hook means 2 and which can be brought into snapping engagement with the first locking element 13. The locking elements 13, 14 are preferably elongated and oriented parallel with the flanges 11, 12. Advantageously, the first portion 4. second portion 5 and first locking element 13 of the fastening device are made of plastic material.

The embodiment of the tool holder in FIG. 5 is different from the one described above in that it comprises another type of locking device. In this embodiment, the first locking element is formed of the outermost edge portion 10 of the second flange 12 and the second locking element 14 is formed of an annular, elastic element 15, which has been slipped onto one leg of the hook means 2 (cf. FIG. 6) and which has a downwardly pointed protrusion 16, which, when securing the fastening device 1 to the suspension bar 7, snaps in under the outermost edge portion 10 of the second flange 12 on the inside thereof.

The tool holders according to FIGS. 1-5 are mounted on the suspension bar 7 in the following manner. The tool holder is moved, inclined slightly forward, towards the suspension bar in such a manner that the second portion 5 of the fastening device can be inserted in the space between the second flange 12 and the web 9 of the suspension bar. The tool holder is then pressed against the suspension bar such that the first portion 4 of the fastening device is introduced in the space between the first flange 11 and the web 9 of the suspension bar. Finally, the tool holder is vigorously pushed downwards with the aid of the hook means, whereby the second locking element 14 snaps into the first locking element 13 and firmly secures the tool holder in position; cf. the mounting sequence of FIGS. 10-13. All this can be carried out with only one hand.

The tool holder is released from the suspension bar by reversing the order of events of the mounting sequence described above. Because the release operation is performed by grabbing the hook means (and pushing it upwards) relatively little force is required, despite the fact that the tool holder is firmly attached to the suspension bar.

FIGS. 6-8 illustrate another embodiment of the tool holder. In this embodiment, the first portion 4 of the fastening device 1 is pivotally connected to its second portion 5 by means of a hinge joint 6. Furthermore, the suspension bar 7 of this embodiment is different from the one illustrated in FIGS. 1-5 in that the first and second flanges 11, 12 are not plane and do not form an acute angle with the web 9, but project from the web at right angles thereto and are bent at right angles to each other at a distance from the web, as described above. A groove 17 or, alternatively, a protrusion (not shown) is provided on the horizontal portion 18 of the second flange 12 and an annular, elastic element 15 having a boss 19 has been slipped onto one of the legs of the hook means 2. The groove 17 and the boss 19 serve as the first 13 and second 14 locking element, respectively, of the locking device 3, the boss 19 snapping into the groove 17 or, alternatively, snapping in behind said protrusion when securing the fastening device 1 to the suspension bar 7.

FIG. 9 illustrates an alternative embodiment of the tool holder in FIGS. 6-8. The difference between this tool holder and the one in FIGS. 6-8 is that the first 4 and second 5 portions of the fastening device 1 as well as the joint 6 are formed in one piece, i.e. they form an integrated unit. The joint 6 is in the form of a tubular section.

Yet another embodiment of the tool holder according to the invention, and a variant thereof, are shown in FIGS. 10-17, and FIGS. 10-13 illustrate mounting thereof on the suspension bar described above in conjunction with the tool holders according to FIGS. 1-5. In these embodiments, the fastening device 1 consists of a body having a length that is considerably greater than the width of the web 9 of the suspension bar 7. The fastening device 1 also has a substantial thickness. The top portion of the fastening device, in its mounted state, is tapering in shape and serves as said first portion 4 thereof. Preferably, this first portion has a shape that corresponds to the shape of the space between the first flange 11 and the web 9 of the suspension bar 7. As shown in FIG. 17, the hook means 2 is attached to the lower, greater portion of the fastening device 1. However, for ease of illustration, the hook means is not shown in FIGS. 10-16.

Between the first portion 4 of the fastening device and its bottom surface 21, as seen in its mounted state, a recess 22 is provided which extends into the fastening device from the inner surface 23 thereof and which is oriented parallel with the bottom surface 21 between the side edges 24 of the fastening device (only one of which is shown in the figures). The shape of the recess 22 corresponds to the shape of the space between the second flange 12 and the web 9 of the suspension bar plus the thickness of the second flange 12, see FIG. 13 in particular. The lowermost edge of the recess 22 has, at its inner surface 23, an upwardly directed protrusion 25, which serves as the second locking element 14 of the locking device, as will be explained below.

With reference to FIG. 14 in particular, the second portion 5 of the fastening device 1 has the shape of a wing, one edge of which in the longitudinal direction has a partly cylindrical section 26. Preferably, the wing has a tapering shape from the section 26 to its opposite edge 27. The wing or second portion 5 of the fastening device is pivotally carried through its partly cylindrical section 26 in a corresponding recess 28 provided at the inner wall of the recess 22 and extending parallel with the bottom surface 21 of the fastening device. The mounting of the tool holder on the suspension bar 7 has been illustrated in FIGS. 10-13 and explained above, and will therefore not be further elaborated upon here. However, FIGS. 12-13 will be explained in more detail. When the fastening device 1 with the hook means (not shown) has been positioned as shown in FIG. 12, the protrusion 25 abuts against the outer surface of the second flange 12 adjacent the web 9, i.e. at the bend 20 of the suspension bar 7. By pushing the hook means 2 downwards the protrusion 25 is pressed past the second flange 12 to snap in against the web 9, whereby the tool holder is secured to the suspension bar 7. Thus, the bend 20 of the suspension bar between the web 9 and the second flange 12 thereof serves as the first locking element 13 of the locking device, while the protrusion 25 of the fastening device serves as its second locking element 14.

FIGS. 14-16 illustrate an alternative embodiment of the tool holder in FIGS. 10-13. The difference between the two embodiments is that the protrusion 25 located at the inner surface 23 of the fastening device in FIGS. 10-13 has been removed and positioned instead in the inner portion of the recess 22, i.e. at a distance from the inner surface 23, and underneath the groove 28. When mounting the tool holder, and more specifically at the final stage of the mounting operation corresponding to the mounting step in FIG. 12, the protrusion 25 snaps in over the outermost edge portion 10 of the second flange 12, whereby the tool holder is secured to the suspension bar, see FIGS. 15 and 16. Thus, the outermost edge portion 10 serves as the first locking element 13 of the locking device, while the protrusion 25 serves as its second locking element 14.

To allow the tool holder according to the invention to be used also without a suspension bar, the fastening device 1 is provided with a pair of through holes 29 for screwing the tool holder directly onto a support, such as a wall. Of course, the holes 29 may also be used to attach the tool holder to the suspension bar in a permanent manner.

In the embodiments of the tool holder according to the invention, the fastening device comprises a locking device. This locking device is not absolutely necessary, however, since the hook means is anchored to the first, upper portion of the fastening device, either directly or indirectly. With an object suspended from the hook means and exerting a load thereon, the first and second portions of the fastening device will be pressed against the web of the suspension bar by the resulting torque and the tool holder will be attached in a displaceable manner to the suspension bar. However, the locking device prevents the tool holder from disengaging from the rail as a result of an upward pressure or blow to the hook means and also prevents lateral displacement of the tool holder.

The invention is not limited to that described above and shown in the drawings and can be modified within the scope of the appended claims. For example, it is possible to apply the locking device of one embodiment of the tool holder to another embodiment of the tool holder in the illustrated working examples of the invention.

The invention claimed is:

1. A tool holder, comprising:
   a suspension bar including a web and at least two flanges, each flange located at an edge of the web and bent towards a central part of the web;
   a hook device configured to suspend at least one of a tool, a piece of sports equipment and other object configured to be suspended from the hook; and
   a fastening device configured to enable the hook device to be releasably attached to the suspension bar, the fastening device including a first portion and a second portion for retaining engagement with the web of the suspension bar and a respective one of the at least two flanges, wherein
      the first portion forms an upper portion of the fastening device when mounted, the hook device being fixedly attached, either directly or indirectly, to the first portion,
      the second portion of the fastening device being pivotally attached to the first portion via a joint, the second portion having a shape of a wing tapering from an edge where the joint is formed to an edge opposite the joint which, with the tool holder in a mounted state, and the second portion is oriented parallel with the suspension bar, the second portion being inserted in the suspension bar between the web and the one of the at least two flanges, and
      the edge where the joint is formed has a partly cylindrical section fitted into a corresponding first recess in the first portion.

2. The tool holder as claimed in claim 1, wherein the fastening device further includes a second recess, extending parallel with said flanges, a shape of the second recess corresponding to the outer surface of one of the at least two flanges, the second portion of the fastening device being pivotally carried in the first recess and including a protrusion, which in cooperation with a bend of the one of the at least two flanges adjacent the web secures the fastening device to the suspension bar.

3. The tool holder as claimed in claim 1, wherein the fastening device includes a pair of through holes for screwing the tool holder to the suspension bar or to a wall.

4. The tool holder as claimed in claim 1, wherein the fastening device is made of plastic material.

5. The tool holder as claimed in claim 1, wherein the first portion has a shape corresponding to a space formed between the web and at least one of the flanges.

6. The tool holder as claimed in claim 1, wherein the first portion is configured to be accepted in a space formed between the web and at least one of the flanges.

7. The tool holder as claimed in claim 1, wherein the partly cylindrical section and the corresponding first recess in the first portion form a hinge.

8. The tool holder as claimed in claim 2, wherein the fastening device includes a protrusion at an edge of the second recess that fits over the bend of the one of the at least two flanges when mounted, the bend and the protrusion forming a locking element that secures the fastening device to the suspension bar.

9. The tool holder as claimed in claim 2, wherein the fastening device includes a protrusion at an edge of the recess that fits over an edge of at least one of the flanges.

10. The tool holder as claimed in claim 1, wherein the suspension bar includes a first locking element and the fastening device includes a second locking element which, when securing the tool holder to the suspension bar, are brought into snapping engagement with one another.

11. The tool holder as claimed in claim 10, wherein the second locking element, when attaching the tool holder to the suspension bar, is in snapping engagement with an outermost edge portion of the one of the at least two flanges.

* * * * *